Dec. 21, 1965    E. E. SHIPLEY    3,224,262

TORQUE METER

Filed Nov. 13, 1962

INVENTOR:
EUGENE E. SHIPLEY,

BY *W. C. Crutcher*

HIS ATTORNEY.

United States Patent Office 3,224,262
Patented Dec. 21, 1965

3,224,262
TORQUE METER
Eugene E. Shipley, Middleton, Mass., assignor to General Electric Company, a corporation of New York
Filed Nov. 13, 1962, Ser. No. 236,846
3 Claims. (Cl. 73—136)

This invention relates to an improved torque meter for determining the torque being transmitted through a train of rotating elements, such as a set of meshed gears.

Measurement of torque transmitted through a system of rotating elements is very difficult due to the fact that torque must be measured while the rotating elements are in motion, whereas, the measuring instrument or device must be stationary, in order to be observed. Various systems have been proposed for measuring transmitted torque; most of these are based on the principle of torsional twisting of a shaft. Strain gages have been used with such systems to measure the deflections, but slip rings are necessary to conduct the electrical signals to a stationary instrument. Other torque measuring systems have used hydraulic pressure signals, which change in proportion to torsional and other deflections throughout the power train brought about by changing torques. The aforementioned systems are subject to difficulties brought about by changing temperatures, extraneous vibrations, weak signals, and slip ring problems. The present torque meter operates on an improved principle which is not dependent on torsional deflections.

Accordingly, one object of the present invention is to provide an improved torque meter which accurately measures the torque transmitted through a rotating power train, such as a set of meshed gears.

Another object of the invention is to provide an improved torque meter, in which the elements which sense the transmitted torque are all stationary and are not subjected to torsion.

Still another object of the invention is to provide an improved torque meter for continuously indicating transmitted torque, which can be compensated for temperature changes, which does not require slip rings, and which is less subject to extraneous error signals due to vibration than prior art torque meters.

Figure 1:
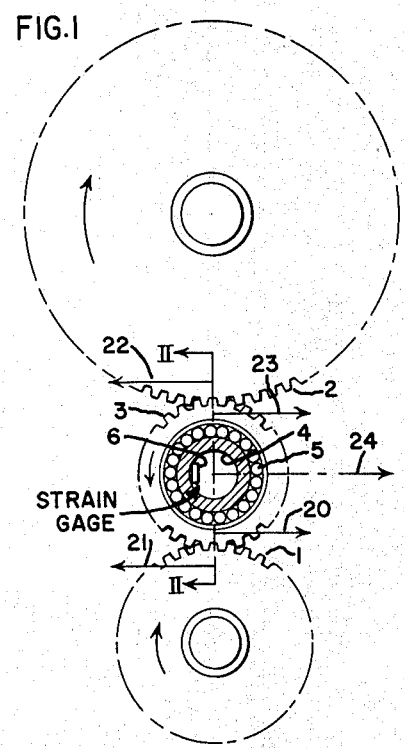
Figure 2:
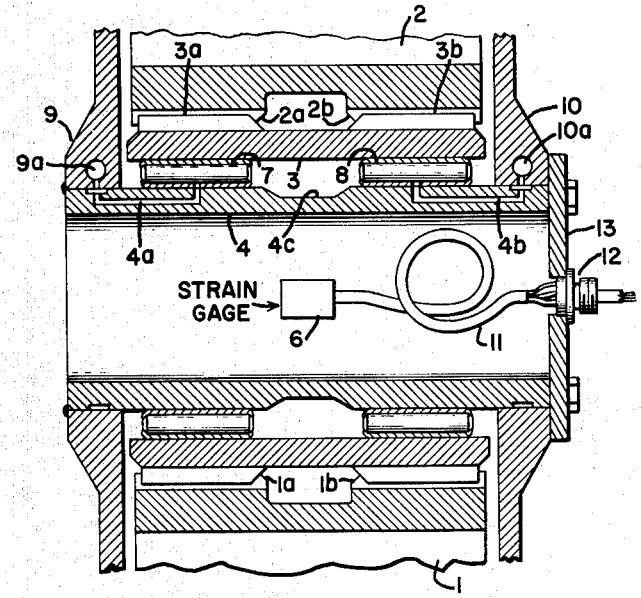
Figure 3:
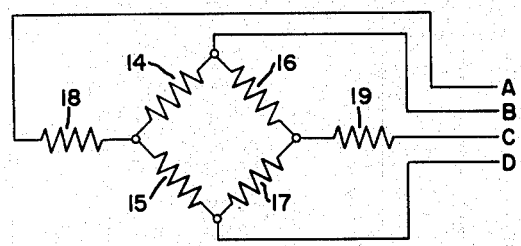
Figure 4:
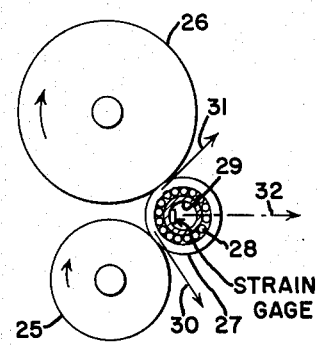
Figure 5:
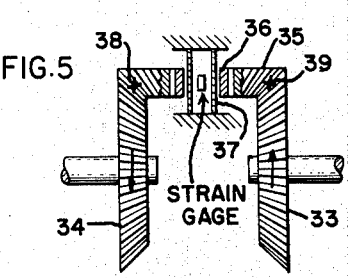

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a schematic view of the torque meter as applied to a gear train, looking in an axial direction, FIG. 2 is an enlarged cross sectional view, taken along lines II—II of FIG. 1, FIG. 3 is a simplified circuit diagram of a strain gage bridge employed in practicing the invention, FIG. 4 is a modification of the invention as applied to a power train with friction drive, and FIG. 5 is another modification as applied to a bevel gear train.

Briefly stated, the invention is practiced by employing an idler to couple two rotating members, the idler being arranged to rotate around a fixed member, which acts as a transversely deflectable beam. An indicator, such as a strain gage measures the beam deflection, which is a function of the tangential forces on the idler and hence, the transmitted torque.

Referring to FIGURE 1 of the drawing, a driving gear 1, rotates a driven gear 2, through an intermediate idler gear 3. Idler gear 3, is rotatably mounted on a fixed hollow shaft 4, by means of roller bearings 5. A strain gage 6, is disposed on the hollow shaft 4, so as to measure its transverse deflection in a direction substantially normal to a line between the axes of gears 1, 2.

Referring to FIGURE 2 of the drawing, the details of the torque meter, as applied to one particular type of structure, is indicated, although it will become apparent as the description proceeds that other arrangements are possible, when the principle of the invention is understood.

As shown, the drive or pinion gear 1, and the driven gear 2, are of the "opposed herringbone" type, each gear 1, 2 having two sets of spaced teeth, 1a, 1b and 2, 2b, respectively. Idler gear 3 has corresponding teeth 3a, 3b meshing with the teeth of gears 1, 2. Sets of roller bearings 7, 8, occupying a substantial axial distance along idler gear 3, allow gear 3 to rotate about a fixed hollow shaft 4. The bearings 7, 8 are arranged to distribute the bearing loads along a substantial portion of the length of shaft 4, so as to load it uniformly. Journal bearings or other types of bearings giving a substantially uniform load along fixed shaft 4, would also be suitable.

Shaft 4 is held securely between stationary support members 9, 10, which may also include oil supply passages 9a, 10a, for lubricating bearings 7, 8, through connecting passages 4a, 4b, in fixed shaft 4. The method of mounting for shaft 4 is such that it acts as a beam fixed at both ends, and will deflect according to well-known laws. Since the bearing loading is not exerted on the central portion of shaft 4, this is reduced in diameter as indicated at 4c, to such a degree that when the loading is imposed on shaft 4 by bearings 7, 8, shaft 4 will deflect approximately as would an equivalent beam with fully uniform load. Reference to standard texts on statics and strength of materials will allow the deflection for a given load to be accurately predetermined.

A strain gage indicator 6, comprising a temperature compensated strain gage bridge, is located near a point of maximum deflection for the type of loading employed. Such strain gages and methods of attachment to indicate deflections are well known in the art and the details of the gage are not material to the present invention. A sensitive movement-amplifying dial gage could also be employed for some applications. An insulated lead wire 11, carries the strain gage leads to an electrical fitting 12, in a stationary end plate 13.

The circuit diagram for a suitable strain gage bridge is shown in FIG. 3. The strain gage input and output leads are labeled A, B, C, D. A calibrated input signal voltage is applied to leads B, D. The current flows through two parallel branches, the first consisting of bridge resistances 14, 15, and the second consisting of bridge resistances 16, 17. Resistances 14, 15, 16, 17 are attached in intimate contact with the inside wall of hollow shaft 4 so that surface deflections will change their resistances. Resistances 14–17 are oriented, so that opposite arms of the bridge will be affected in a like manner by the same deflection. Additional resistors 18, 19, are connected at one end to the junctions between bridge resistors 14, 15, and 16, 17, respectively, and at the other end to output leads A, C respectively. Resistors 18, 19, are used to correct for the modulus of elasticity of the shaft 4. The bridge output signal is taken from terminals A, C, and led to a suitable indicating meter (not shown.) Strain gage bridges similar to the one shown in FIG. 3 are obtainable from many commercial sources and further details thereof are not material to the present invention. Since changing temperatures affect all resistances 14–19 equally and since the bridge is symmetrically arranged, it will automatically be temperature compensated.

Operation of the improved torque meter may be understood by reference first to FIG. 1, wherein gears 1, 2, and 3, rotate in the directions shown by the arrows. Driving gear 1, exerts a tangential force on the teeth of idler 3, which may be represented by force vector 20. An equal but opposite reaction force, shown as vector 21, is imposed tangentially on gear 1. (It will be understood that these tangential forces are actually exerted at the pitch circle diameters, but are displaced slightly in the drawing to add clarity.)

Similarly, idler gear 3, exerts a tangential force 22 on driven gear 2. A tangential reaction force 23 is, in turn, exerted on idler gear 3 by the driven gear 2. It will be noted that the tangential forces on idler gear 3, represented by vectors 20, 23, are in the same direction and normal to the axis of idler gear 3. The vector sum of these forces may be represented by vector 24, which is the resultant transverse force exerted on the fixed shaft 4.

Referring to FIGURE 2 of the drawing, the force represented by resultant vector 24, may be considered substantially uniformly distributed on the hollow fixed shaft 4 (the force is exerted out of the plane of the drawing towards the viewer). Since shaft 4, behaves in deflection as a beam fixed at both ends, the location of maximum deflection will be in the center of shaft 4, at the point where strain gage 6 is located. Obviously, strain gage 6 could also be placed diametrically opposite from the position shown in FIGURE 1 with the same effect, or a dual system of strain gages could be used to reduce the possibility of error. Strain gage 6 could also be angularly displaced somewhat from the position shown. However, the signal would be correspondingly reduced.

Since the deflection of a uniformly loaded beam is proportional to the load, strain gage 6 will produce an indication on the external instruments which is proportional to the deflection, which, in turn, is proportional to the transverse force. The transverse force is, of course, equal to the vector sum of the tangential forces at the pitch circles, which are proportional to the torque transmitted through the train of gears.

FIG. 4 illustrates a modified form of the invention as applied to a friction-coupled power train. A drive wheel 25 turns a driven wheel 26 through an idler wheel 27. The friction between wheels 25, 26, 27 serves to transmit torque between them. A set of bearings 28 rotatably journals idler wheel 27 about a fixed hollow shaft 29. The mounting structure and strain gage location for shaft 29 may be as previously described.

It will be observed that a tangential force 30 is exerted on idler 27 by the drive wheel 25. As before, the reaction on the idler 27 brought about by the tangential force (not shown) which it exerts on driven wheel 26, is illustrated by vector 31. The vector sum of forces 30, 31 is shown as vector 32. Force 32 serves to transversely deflect shaft 29, as previously, by an amount proportional to transmitted torque. Hence it is not absolutely necessary that the axes of all three rotating members be in a common plane as they are in FIG. 1.

FIG. 5 illustrates the invention as applied to a bevel gear train. A drive gear 33 rotates a driven gear 34 in the direction shown by the arrows, through a bevel idler gear 35. Idler 35 is rotatably journaled on a bearing 36 about a fixed hollow shaft 37. The tangential force on gear 35 and the tangential reaction force on gear 35 are into the plane of the drawing and are represented by cross marks 39, 38 respectively. Fixed shaft 37 will deflect into the plane of the drawing by an amount proportional to the transmitted torque. The maximum deflection will be at the center of shaft 37, where the strain gage will measure the deflection.

It will be observed that, since the fixed shafts in the various embodiments of the invention are stationary, there is no requirement for slip rings to transmit the electrical signals to the stationary measuring instruments. Also, there is no necessity for attaching the strain gage to withstand centrifugal forces, as has been necessary with previous torque meters using strain gages.

The torque meter is temperature compensated, since variations in temperature affect all four resistances 14–17 of FIG. 3 equally. Calibration for different moduli of elasticity can easily be accomplished by suitably selecting the resistors 18, 19.

While the preferred embodiment of the invention shown employs a driving and a driven gear with an idler all having axes in a common plane, it will be apparent from the modifications illustrated, that the arrangement is applicable to a staggered idler, and is likewise not limited to gear trains, but is applicable to rotating members coupled for torque transmission by other means.

Other modifications of the invention will occur to those skilled in the art, and while there has been described what is at present considered to be the preferred embodiment of the invention, it is intended to cover in the appended claims all such modifications as fall within the true spirit and scope of the invention.

What I claim as new and desire to secure by Letters Patent of the United States is:

1. A torque meter for a rotatable power train comprising:
   first and second spaced rotatable members,
   a third rotatable member coupled to both said first and second members to transmit torque therebetween,
   a fixed hollow shaft supporting and rotatably journaling said third member, said shaft being subject to transverse deflection due to the tangential forces on the third member arising from the coupling between said members, and
   a temperature-compensated strain gage bridge affixed to the inner wall of the hollow shaft near the midpoint thereof and substantially equidistant from the points where said third member contacts said first and second members, whereby transverse deflection of said fixed shaft will effect a strain-gage output signal proportional to torque transmitted between said first and third rotatable members.

2. A torque meter for a rotating gear train comprising:
   a first driving gear,
   an idler gear meshing with said driving gear,
   a driven gear meshing with said idler gear,
   a hollow stationary shaft supporting said idler gear and substantially fixed at either end thereof, said shaft being deflectable due to the resultant of action and reaction forces on the teeth of the idler gear,
   bearing means rotatably journaling the idler gear on the hollow shaft, said bearing means being disposed to distribute the bearing load substantially uniformly over the length of the hollow shaft, and
   a temperature-compensated strain gage bridge affixed to the inner wall of the hollow shaft near the midpoint thereof and substantially halfway between sets of meshing gear teeth, whereby transverse deflection of said fixed shaft will effect a strain-gage output signal proportional to torque transmitted from the driving gear to the driven gear.

3. A torque meter for a rotating gear train comprising:
   a first driving gear,
   an idler gear aligned with and meshing with said driving gear,
   a driven gear aligned with and meshing with said idler gear, the axes of said gears lying substantially in a common plane,
   a hollow stationary shaft supporting said idler gear and substantially fixed at either end thereof, said shaft being deflectable due to transverse action and reaction forces on the teeth of the idler gear, bearing means rotatably journaling the idler gear on the hollow shaft, said bearing means being disposed to distribute the bearing load substantially uniformly over the length of the hollow shaft, and a temperature-compensated strain gage bridge affixed to the inner wall of the hollow shaft near the midpoint thereof and substantially halfway between sets of meshing gear teeth, whereby transverse deflection of said fixed shaft will effect a strain-gage output signal proportional to torque transmitted from the driving gear to the driven gear.

References Cited by the Examiner

UNITED STATES PATENTS

| | | | |
|---|---|---|---|
| 2,899,822 | 8/1959 | Matthews | 73—136 |
| 2,979,943 | 4/1961 | Gualtieri | 73—136 |

FOREIGN PATENTS

| | | |
|---|---|---|
| 1,245,001 | 9/1960 | France. |
| 139,110 | 3/1960 | U.S.S.R. |

RICHARD C. QUEISSER, *Primary Examiner.*

JOSEPH P. STRIZAK, *Examiner.*

C. A. RUEHL, *Assistant Examiner.*